US012657464B2

(12) United States Patent
Cho et al.

(10) Patent No.: US 12,657,464 B2
(45) Date of Patent: Jun. 16, 2026

(54) METHOD AND APPARATUS FOR COMPRESSING ARTIFICIAL NEURAL NETWORK

(71) Applicant: Samsung Electronics Co., Ltd., Suwon-si (KR)

(72) Inventors: Minkyoung Cho, Incheon (KR); Saerom Choi, Incheon (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1098 days.

(21) Appl. No.: 17/191,954

(22) Filed: Mar. 4, 2021

(65) Prior Publication Data

US 2022/0108180 A1 Apr. 7, 2022

(30) Foreign Application Priority Data

Oct. 5, 2020 (KR) ........................ 10-2020-0128136

(51) Int. Cl.
*G06N 3/082* (2023.01)
*G06N 3/084* (2023.01)

(52) U.S. Cl.
CPC ............. *G06N 3/082* (2013.01); *G06N 3/084* (2013.01)

(58) Field of Classification Search
CPC ............................... G06N 3/082; G06N 3/084
USPC ......................................................... 706/15
See application file for complete search history.

(56) References Cited

U.S. PATENT DOCUMENTS

| | | | |
|---|---|---|---|
| 9,411,884 B1 | 8/2016 | Tzanetakis et al. | |
| 10,552,737 B2 | 2/2020 | Seibold et al. | |
| 10,635,579 B2 | 4/2020 | Zhang et al. | |
| 10,832,135 B2 * | 11/2020 | Ji ........................... | G06N 3/082 |
| 2017/0337467 A1 | 11/2017 | Kadav et al. | |
| 2018/0046919 A1 | 2/2018 | Li et al. | |
| 2018/0114114 A1 | 4/2018 | Molchanov et al. | |
| 2018/0181867 A1 | 6/2018 | Seibold et al. | |
| 2018/0232640 A1 | 8/2018 | Ji et al. | |
| 2019/0005377 A1 | 1/2019 | Malaya | |

(Continued)

FOREIGN PATENT DOCUMENTS

| | | |
|---|---|---|
| CN | 107679617 A | 2/2018 |
| CN | 108416187 A | 8/2018 |

(Continued)

OTHER PUBLICATIONS

Thomas, P. et al., "Robust Pruning for Multilayer Perceptrons," *IMACS/IEEE multiconference on computational engineering in systems applications CESA*, vol. 98, 1998 (pp. 1-6).

(Continued)

*Primary Examiner* — Tsu-Chang Lee
(74) *Attorney, Agent, or Firm* — NSIP Law

(57) ABSTRACT

A method and apparatus for compressing an artificial neural network may acquire weights corresponding to an artificial neural network trained in advance, wherein the artificial neural network includes a plurality of layers, and a processor configured to generate data for acquiring a change of behavior of the artificial neural network due to pruning of the artificial neural network based on the weights, determine a pruning threshold for pruning of the artificial neural network based on the change of the behavior of the artificial neural network, and compress the neural network based on the pruning threshold.

27 Claims, 9 Drawing Sheets

FIG. 3

(56)     References Cited

U.S. PATENT DOCUMENTS

| | | |
|---|---|---|
| 2019/0050735 A1 | 2/2019 | Ji et al. |
| 2020/0184333 A1 | 6/2020 | Oh |
| 2021/0081798 A1 * | 3/2021 | Cho ........................ G06N 3/082 |
| 2022/0019855 A1 | 1/2022 | Chen et al. |

FOREIGN PATENT DOCUMENTS

| | | |
|---|---|---|
| CN | 110084281 A | 8/2019 |
| KR | 10-2018-0092810 A | 8/2018 |
| KR | 10-2019-0018885 A | 2/2019 |

OTHER PUBLICATIONS

Han, Song, et al., "Learning both Weights and Connections for Efficient Neural Networks," *arXiv preprint arXiv:1506.02626*, 2015 (pp. 1-9).
Ashouri, Amir H., et al., "Retraining-free methods for fast on-the-fly pruning of convolutional neural networks," *Neurocomputing*, 370, 2019 (pp. 56-69).
Lee, Namhoon, et al. "Snip: Single-Shot Network Pruning Based on Connection Sensitivity." *arXiv:1810.02340v2* Feb. 23, 2019 (15 pages in English).
Azarian, Kambiz, et al. "Learned Threshold Pruning." *arXiv:2003.00075v1* Feb. 28, 2020 (11 pages in English).
Extended European Search Report issued on Feb. 18, 2022 in counterpart European Patent Application No. 21193022.7 (9 pages in English).
European Office Action issued on Nov. 27, 2024, in counterpart European Patent Application No. 21 193 022.7 (7 pages).
Mirkes, Evgeny M., "Artificial Neural Network Pruning to Extract Knowledge", 2020 International Joint Conference on Neural Networks, arXiv:2005.06284v1, May 13, 2020, (9 Pages in English).
Bao, Rongxin, "Research on Compressing Deep Neural Network Based on Pruning", Full-Text Database of China's Excellent Master's Theses, Issue 2, vol. 2020, Feb. 15, 2020, (2 Pages in English, 18 Pages in Chinese).
Li, Huiwei, "Study on Convolutional Neural Network Compression Methods Based on Pruning and Quantization", Full-text Database of China's Excellent Master's Theses, Issue 7, vol. 2020, Jul. 15, 2020, (10 Pages in English, 57 Pages in Chinese).
Chinese Office Action Issued on Jun. 24, 2025, in Counterpart Chinese Patent Application No. 202110246596.3 (13 Pages in English, 11 Pages in Chinese).
Korean Office Action issued on Feb. 27, 2026, in counterpart Korean Patent Application No. 10-2020-0128136 (3 pages in English, 6 pages in Korean).

\* cited by examiner

1

METHOD AND APPARATUS FOR COMPRESSING ARTIFICIAL NEURAL NETWORK

CROSS-REFERENCE TO RELATED APPLICATIONS

This application claims the benefit under 35 USC § 119(a) of Korean Patent Application No. 10-2020-0128136, filed on Oct. 5, 2020, in the Korean Intellectual Property Office, the entire disclosure of which is incorporated herein by reference for all purposes.

BACKGROUND

Field

The following description relates to a method and apparatus for compressing an artificial neural network.

2. Description of Related Art

An artificial neural network may require a large amount of computation for complex input data. As a quantity of data trained by the artificial neural network increases, connections between layers constituting the artificial neural network may be more complicated. In addition, as the quantity of data trained by the artificial neural network increases, an accuracy of previous training data increases but over-fitting may occur, which may lead to a degradation in reliability of a predicted value of new input data. As the complexity of the artificial neural network increases, an amount of memory allocation is also excessively increased, which may cause a problem in miniaturization and commercialization. Accordingly, there is a desire for a compression method for reducing system costs in implementing an artificial neural network while maintaining the performance of the artificial neural network.

The above description has been possessed or acquired by the inventor(s) in the course of conceiving the present disclosure and is not necessarily an art publicly known before the present application is filed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of compressing an artificial neural network, the method including acquiring weights corresponding to an artificial neural network trained in advance, wherein the artificial neural network includes a plurality of layers, generating data for acquiring a change of behavior of the artificial neural network due to pruning of the artificial neural network based on the weights, determining a pruning threshold for pruning of the artificial neural network based on the change of the behavior of the artificial neural network, and compressing the neural network based on the pruning threshold.

The determining of the pruning threshold may include measuring, for each layer of the plurality of layers, a pruning sensitivity indicating a degree to which the behavior of the artificial neural network changes during pruning of the each layer of the artificial neural network, and determining the pruning threshold by performing pruning for the each of the plurality of layers based on the pruning sensitivity measured for the each of the plurality of layers.

The measuring of the pruning sensitivity may include measuring, for each layer of the plurality of layers, the pruning sensitivity by gradually increasing a percentile-based pruning threshold for a corresponding layer, in response to the behavior of the artificial neural network being maintained by pruning of the corresponding layer.

The pruning sensitivity may be determined based on at least one of a distribution of weights corresponding to the layers or a form of connection between the layers.

The determining of the pruning threshold may include selecting a layer from among the plurality of layers in an ascending order of the pruning sensitivity, determining a percentile-based pruning threshold corresponding to the selected layer such that the behavior of the artificial neural network is maintained by pruning of the selected layer, and repetitively performing the selecting of the layer and the determining of the percentile-based pruning threshold, for each of remaining layers other than the selected layer from among the plurality of layers.

The determining of the pruning threshold may include selecting a layer from among the plurality of layers in an ascending order of the pruning sensitivity, pruning the selected layer to determine a percentile-based pruning threshold, and determining a percentile-based pruning threshold, in response to upper k classes predicted by the artificial neural network before the pruning being included in upper p classes predicted by the artificial neural network after the pruning, wherein k and p each are a natural number and k p.

The determining of the percentile-based pruning threshold may include increasing the percentile-based pruning threshold by a set interval, in response to the behavior of the artificial neural network being maintained by the pruning of the selected layer.

The change of the behavior of the artificial neural network may be measured based on whether outputs before and after applying the pruning to the artificial neural network satisfy a decision criterion.

The decision criterion may include a condition that upper p classes predicted by a pruned artificial neural network include upper k classes predicted by an unpruned artificial neural network, wherein k and p each are a natural number and k p.

The pruning threshold may include a percentile-based pruning threshold for each layer of the plurality of layers, and the compressing of the artificial neural network may include applying, for each of a plurality of kernels in a layer of the plurality of layers, a magnitude-based pruning threshold to a corresponding kernel based on a percentile-based pruning threshold of a corresponding layer.

The compressing of the artificial neural network may include removing a percentage of the weights of the artificial neural network, wherein the percentage of the weights corresponds to the percentile-based pruning threshold.

The generating of the data may include generating, based on the weights, the data by repetitively correcting an input image by the artificial neural network until a class predicted in the artificial neural network is a target class from a plurality of classes.

The input image may include a random noise image.

The generating of the data may include back-propagating a cross-entropy loss between a one-hot vector corresponding to the target class and a class predicted in the artificial neural network.

The weights may be fixed without changing during back-propagation of the cross-entropy loss.

In another general aspect, there is provided an apparatus for compressing an artificial neural network, the apparatus including an communication interface configured to acquire weights corresponding to an artificial neural network trained in advance, wherein the artificial neural network includes a plurality of layers, and a processor configured to generate data for acquiring a change of behavior of the artificial neural network due to pruning of the artificial neural network based on the weights, determine a pruning threshold for pruning of the artificial neural network based on the change of the behavior of the artificial neural network, and compress the neural network based on the pruning threshold.

The processor may be configured to measure, for each layer of the plurality of layers, a pruning sensitivity indicating a degree to which the behavior of the artificial neural network changes during pruning of the each layer of the artificial neural network, and to determine the pruning threshold by performing pruning for the each of the plurality of layers based on the pruning sensitivity measured for the each of the plurality of layers.

The processor may be configured to measure, for each layer of the plurality of layers, the pruning sensitivity by gradually increasing a percentile-based pruning threshold for a corresponding layer, in response to the behavior of the artificial neural network being maintained by pruning of the corresponding layer.

The pruning sensitivity may be determined based on at least one of a distribution of weights corresponding to the layers or a form of connection between the layers.

The processor may be configured to select a layer from among the plurality of layers in an ascending order of the pruning sensitivity, to determine a percentile-based pruning threshold corresponding to the selected layer such that the behavior of the artificial neural network is maintained by pruning of the selected layer, and to repetitively perform a process of selecting the layer and a process of determining the percentile-based pruning threshold, for each of remaining layers other than the selected layer among the plurality of layers.

The change of the behavior of the artificial neural network may be measured based on whether outputs before and after applying the pruning to the artificial neural network satisfy a decision criterion.

The decision criterion may include a condition that upper p classes predicted by a pruned artificial neural network include upper k classes predicted by an unpruned artificial neural network, wherein k and p each are a natural number and k p.

The pruning threshold may include a percentile-based pruning threshold for each layer of the plurality of layers, and the processor may be configured to apply, for each of a plurality of kernels in a layer of the plurality of layers, a magnitude-based pruning threshold to a corresponding kernel based on a percentile-based pruning threshold of a corresponding layer.

The processor may be configured to generate, based on the weights, the data by repetitively correcting an input image by the artificial neural network until a class predicted in the artificial neural network is a target class from a plurality of classes.

The input image may include a random noise image.

The processor may be configured to back-propagate a cross-entropy loss between a one-hot vector corresponding to the target class and a class predicted in the artificial neural network.

The weights may be fixed without changing during back-propagation of the cross-entropy loss.

The apparatus may include at least one of an advanced driver assistance system (ADAS), a head-up display (HUD) device, a three-dimensional (3D) digital information display (DID), a navigation device, a neuromorphic device, a 3D mobile device, a smartphone, a smart television (TV), a smart vehicle, an Internet of Things (IoT) device, a medical device, or a measurement device.

Other features and aspects will be apparent from the following detailed description, the drawings, and the claims.

Figure 1:
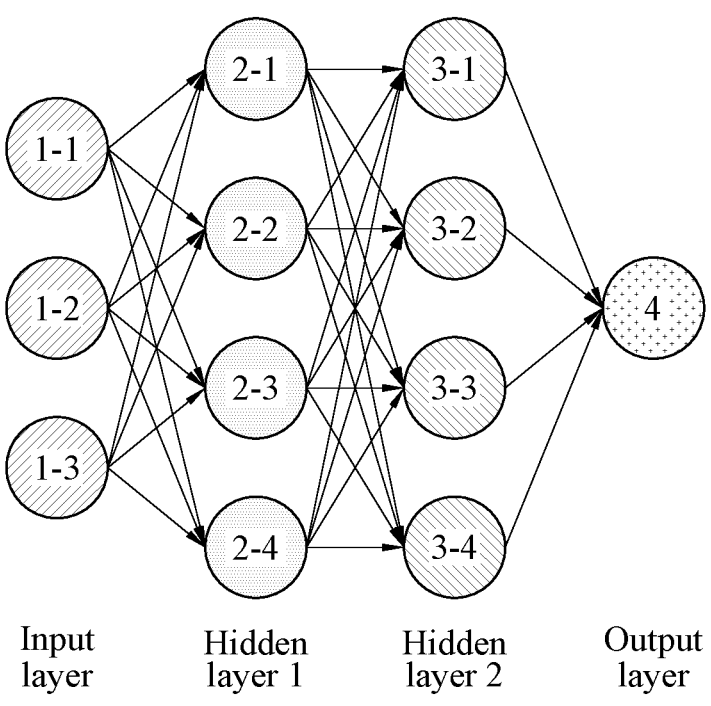
FIG. 1 is a diagram illustrating an example of an artificial neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Regarding the reference numerals assigned to the elements in the drawings, it should be noted that the same elements will be designated by the same reference numerals, wherever possible, even though they are shown in different drawings. Also, in the description of examples, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled, or joined to the second component.

A component having a common function with a component included in one example is described using a like name in another example. Unless otherwise described, a description made in one example may be applicable to another example and a detailed description within a duplicate range is omitted.

FIG. 1 is a diagram illustrating an example of an artificial neural network. FIG. 1 illustrates a configuration of a deep neural network (DNN) corresponding to an example of an artificial neural network. Hereinafter, for brevity, a description is given of a structure of the DNN, it is merely an example, and artificial neural networks of various structures may be used.

The DNN is a method of implementing an artificial neural network and may include a plurality of layers. The DNN may include, for example, an input layer to which input data is applied, an output layer that outputs a result value obtained through prediction performed using input data based on training, and multiple hidden layers between the input layer and the output layer.

The DNN is classified as, for example, a convolutional neural network (CNN) and a recurrent neural network (RNN) based on an algorithm used to process information. Hereinafter, according to a general practice in a field of the artificial neural network, the input layer is referred to as a lowermost layer, the output layer is referred to as an uppermost layer, and layers from the output layer which is the uppermost layer to the input layer which is the lowermost layer may be sequentially ranked to be named. For example, a hidden layer 2 may be an upper layer compared to a hidden layer 1 and the input layer, and a lower layer compared to the output layer.

For example, among layers neighboring in the DNN, a relatively upper layer may receive a value obtained by multiplying an output value of a relatively lower layer by a weight and applying a bias to a result of the multiplication, thereby outputting a predetermined operation result. At this time, the output operation result may be applied to an upper layer neighboring the corresponding layer in a similar manner.

A method of training an artificial neural network is referred to as, for example, deep learning. As described above, various algorithms such as a convolutional neural network and recurrent neural network method may be used for deep learning.

In one example, "training an artificial neural network" may be understood in a broad sense including determining and updating a weight (weights) and a bias (biases) between layers, and/or determining and updating a weight (weights) and a bias (biases) between a plurality of neurons belonging to different layers among adjacent layers.

For example, a plurality of layers, a hierarchical structure of the plurality of layers, and weights and biases of neurons may all be collectively expressed as a "connectivity" of an artificial neural network. Therefore, training an artificial neural network may also be understood as building and training the connectivity.

In the artificial neural network, each of the plurality of layers may include a plurality of nodes. A node may correspond to a neuron of the artificial neural network. In the following description, the term "neuron" may be interchangeably used with the term "node."

In a DNN of FIG. 1, it can be seen that connection relationships are formed between combinations of a plurality of nodes included in one layer and a plurality of nodes included in a neighboring layer. As such, a state in which combinations of all nodes included in neighboring layers of the artificial neural network are connected may be called a "fully-connected" state. For example, as illustrated in FIG. 1, a node 3-1 of the hidden layer 2 may be connected to all nodes, that is, nodes 2-1 through 2-4 of the hidden layer 1 to receive a value obtained by multiplying an output value of each of the nodes by a predetermined weight.

Data input to the input layer may be processed through the plurality of hidden layers, so that an output value is output through the output layer. Here, the greater the weight by which the output value of each node is multiplied, the stronger the connectivity between two corresponding nodes. Also, the smaller the weight, the weaker the connectivity between the two nodes. The weight may have, for example, a value ranging from 0 to 1. If the weight is 0, the two nodes have no connectivity therebetween.

Meanwhile, as the connectivity between nodes through the weight increases, the connectivity of the artificial neural network is strengthened while a complexity is also increased. Accordingly, an amount of memory allocation for storing the weight may increase. Also, a speed of performing tasks of the entire artificial neural network is hindered. Thus, a work efficiency of the artificial neural network may be reduced.

Figure 2:
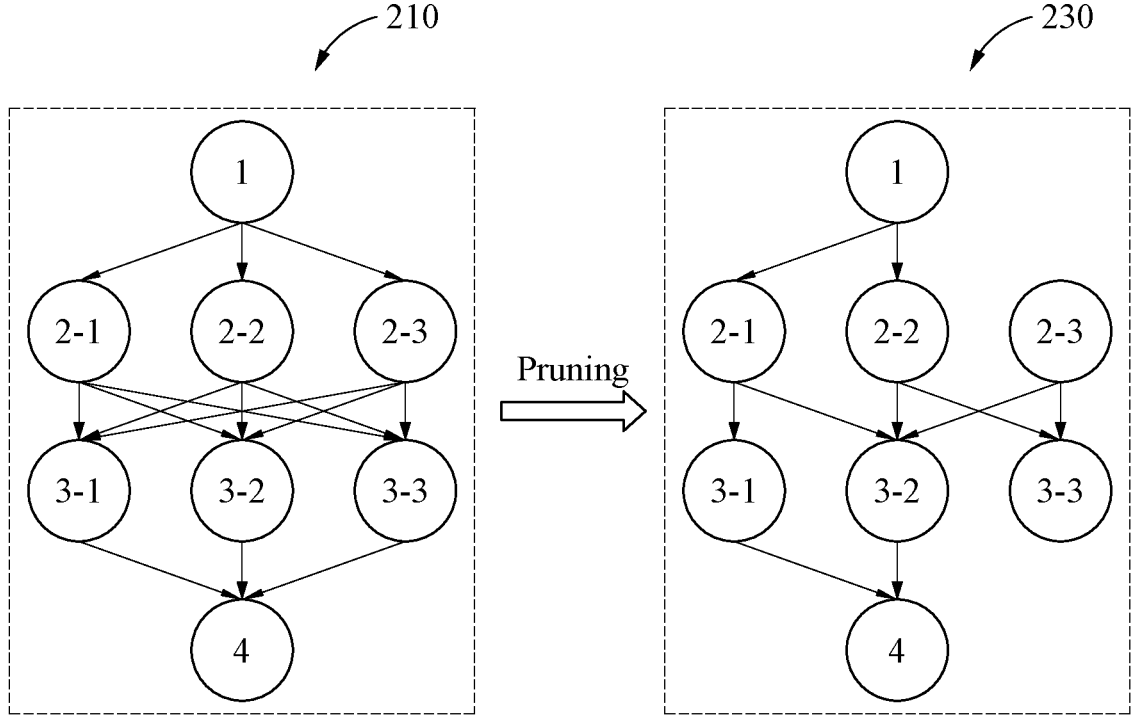
FIG. 2 is a diagram illustrating an example of pruning.

FIG. 2 is a diagram illustrating an example of pruning. Referring to FIG. 2, a part 210 shows a structure of an artificial neural network obtained before pruning is performed and a part 230 shows a structure of an artificial neural network obtained after pruning is performed.

In the part 210, it can be seen that combinations of all nodes included in two different neighboring layers of the artificial neural network are fully connected. When the artificial neural network is fully connected, a weight indicating a strength of a connection between two predetermined nodes belongs to different neighboring layers included in the artificial neural network may have a value greater than 0. As shown in the part 210, when neurons of all neighboring layers of the artificial neural network have the connectivity, the complexity of the entire artificial neural network may increase. Also, in this case, an accuracy and a reliability of a prediction result of the artificial neural network may decrease due to overfitting.

To prevent this, pruning may be performed on a portion of the artificial neural network as shown in the part 230. For example, in the artificial neural network obtained before the pruning is performed as shown in the part 210, a weight between a node 1 and a node 2-3 may be less than or equal to a predetermined threshold. In this example, to determine a portion of the artificial neural network to be pruned, a compression apparatus may search for a portion (for example, between the node 1 and the node 2-3) having the weight less than or equal to the threshold from the artificial neural network. The compression apparatus may perform pruning for removing a connectivity of the portion having the weight less than or equal to the threshold. In this instance, the compression apparatus may prune the artificial neural network by reducing or removing a portion of layers and/or a portion of weights of the artificial neural network which may not substantially deteriorate a prediction (or inference) accuracy of the artificial neural network.

As such, the pruning may be performed on a layer of the artificial neural network that does not substantially affect an output of the artificial neural network. For example, the pruning may be performed on one or more input feature maps of a layer, which may not substantially affect an output feature map generated by the layer.

The compression apparatus may perform the pruning by searching for a connection between neurons of which weights have values less than the threshold. A connection relationship corresponding to all the weights identified as having values less than the threshold may be removed or completely tuned to 0, or otherwise neglected. For example, the compression apparatus may select layers having weights less than the threshold as candidates to be pruned in the artificial neural network.

Figures 3, 4:
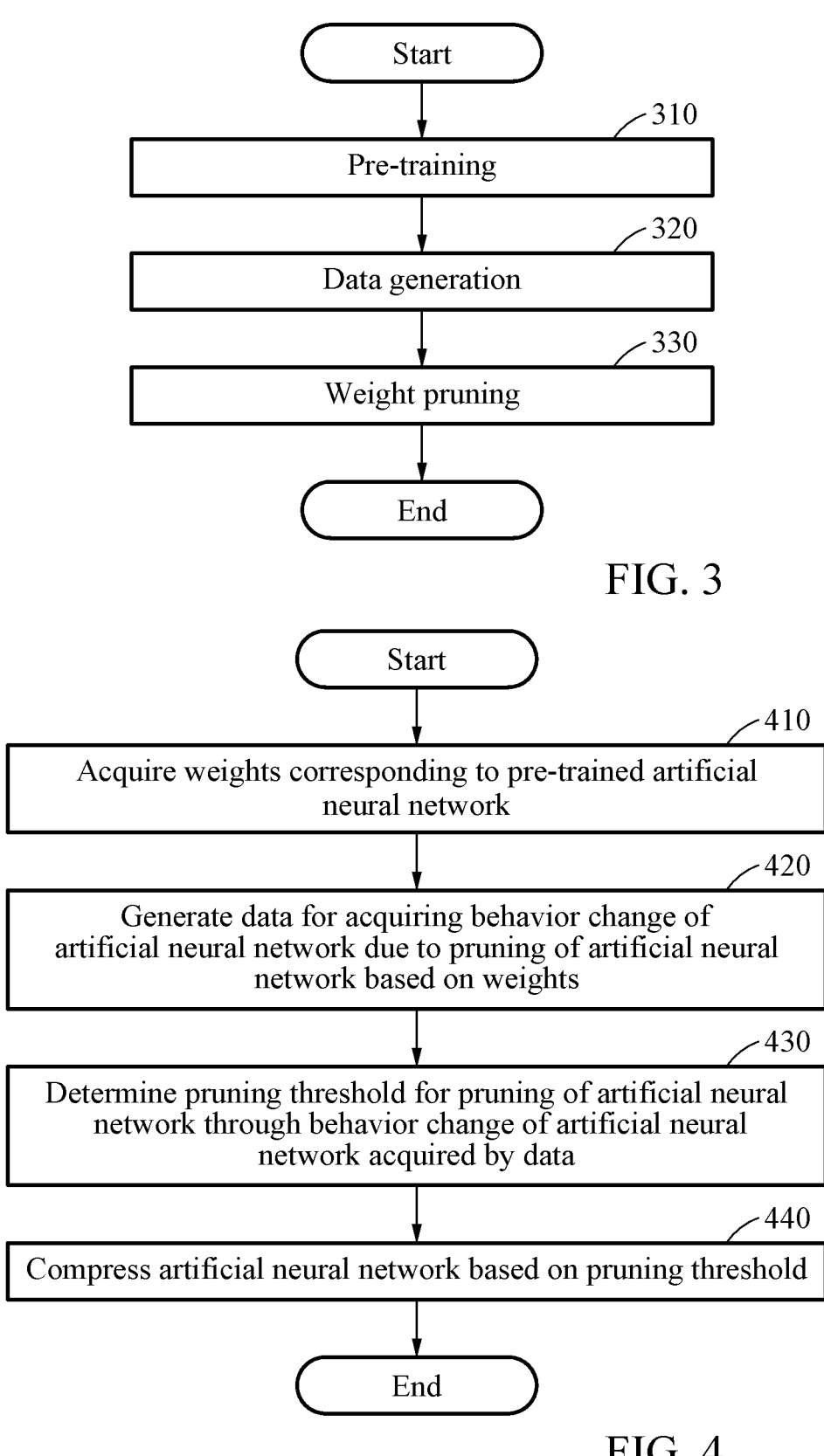
FIG. 3 is a diagram illustrating an example of a method of compressing an artificial neural network.
FIG. 4 is a diagram illustrating an example of a method of compressing an artificial neural network.

FIG. 3 is a diagram illustrating an example of a method of compressing an artificial neural network. Referring to FIG. 3, a compression apparatus may perform pruning through operations 310 to 330, thereby compressing an artificial neural network.

In operation 310, the compression apparatus may acquire weights corresponding to a pre-trained artificial neural network. In an example, the artificial neural network may build an inference model through training for desired operations. In addition, the artificial neural network may output an inference result with respect to an external input value based on the built inference model. The artificial neural network may be applied to, for example, a facial recognition module or software for a smartphone, recognition/classification operations such as object recognition, speech recognition, and image classification, medical and diagnostic devices, and unmanned systems, and may be implemented as a dedicated processing device for processing image data to extract meaningful information.

In operation 320, the compression apparatus generates data based on weights received in operation 310. The data may be, for example, data for acquiring a behavior change of the artificial neural network due to the pruning. Operation 320 may correspond to a process of generating data optimized for acquiring an influence of the pruning on an output value of the artificial neural network, for example, the behavior change of the artificial neural network due to the pruning. In operation 320, the compression apparatus may generate data by repetitively training on an input image generated in order for the artificial neural network to predict a predetermined class.

In operation 330, the compression apparatus may generate a pruning threshold using the data generated in operation 320 and prune layers having weights less than the determined pruning threshold. Operation 330 may correspond to a process of determining a pruning threshold optimized for a corresponding artificial neural network through the data generated in operation 320.

FIG. 4 is a diagram illustrating an example of a method of compressing an artificial neural network. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. For example, a compression apparatus may compress an artificial neural network through operations 410 to 4401*n* addition to the description of FIG. 4 below, the descriptions of FIGS. 1-3 are also applicable to FIG. 4, and are incorporated herein by reference. Thus, the above description may not be repeated here. Referring to FIG. 4.

In operation 410, the compression apparatus acquires weights corresponding to a pre-trained artificial neural network. The artificial neural network includes a plurality of layers.

In operation 420, the compression apparatus generates data for acquiring a behavior change of the artificial neural network due to pruning of the artificial neural network based on the weights acquired in operation 410. The behavior change of the artificial neural network may be measured based on, for example, whether outputs obtained before and after applying the pruning to the artificial neural network satisfy a decision criterion. The decision criterion may include, for example, a condition that upper p classes predicted by a pruned artificial neural network include upper k classes predicted by an unpruned artificial neural network, k and p each being a natural number and k p.

In operation 420, the compression apparatus generates, based on the weights acquired in operation 410, the data by repetitively correcting an input image by the artificial neural network until a class predicted in the artificial neural network is a target class that is one of a plurality of classes. The input image may include, for example, a random noise image. A method of generating data by a compression apparatus is described below in greater detail with reference to FIGS. 5 and 6.

In operation 430, the compression apparatus determines a pruning threshold for pruning of the artificial neural network through the behavior change of the artificial neural network acquired by the data. The pruning threshold may include, for example, a percentile-based pruning threshold for each of a plurality of layers. A method of determining a pruning threshold by a compression apparatus is described below in greater detail with reference to FIGS. 7 through 10.

In operation 440, the compression apparatus compresses the artificial neural network based on the pruning threshold determined in operation 430. Here, the "compressing" refers to reducing a capacity of the artificial neural network. The compression apparatus may compress the artificial neural network by performing the pruning using the pruning threshold determined in operation 430. For example, in a case in which the pruning threshold is determined as 40%, the compression apparatus may compress the artificial neural network by performing the pruning on weights corresponding to lower 40% of the weights of the artificial neural network. The compression apparatus may remove weights having less influence on a task accuracy of the artificial neural network from the weights of the artificial neural network based on the pruning threshold, thereby reducing the capacity of the artificial neural network.

In some cases, each of the layers of the artificial neural network may include a plurality of kernels. In such cases, for each of the plurality of kernels included in each layer in the artificial neural network, the compression apparatus may apply a magnitude-based pruning threshold to a corresponding kernel based on a percentile-based pruning threshold of a corresponding layer. A method of applying a magnitude-based pruning threshold to a corresponding kernel by a compression apparatus is described below in greater detail with reference to FIG. 11.

Figure 5:
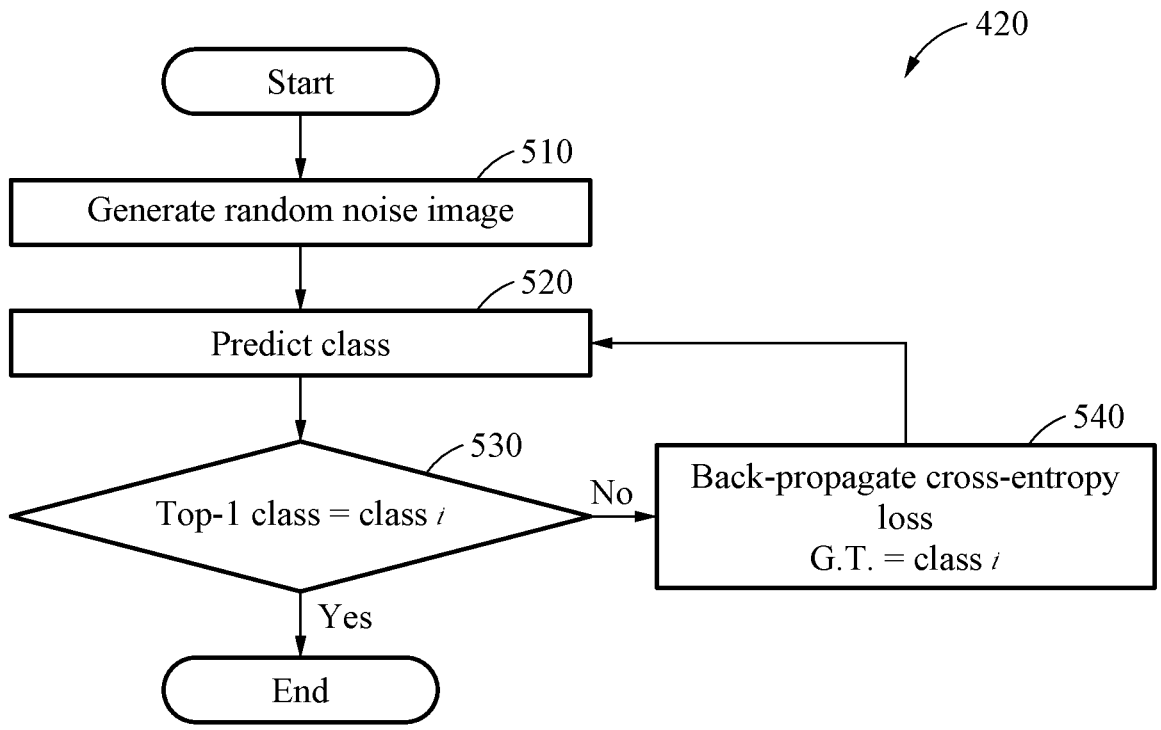
FIG. 5 is a diagram illustrating an example of a method of generating data.

FIG. 5 is a diagram illustrating an example of a method of generating data. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here. Referring to FIG. 5.

Figure 6:
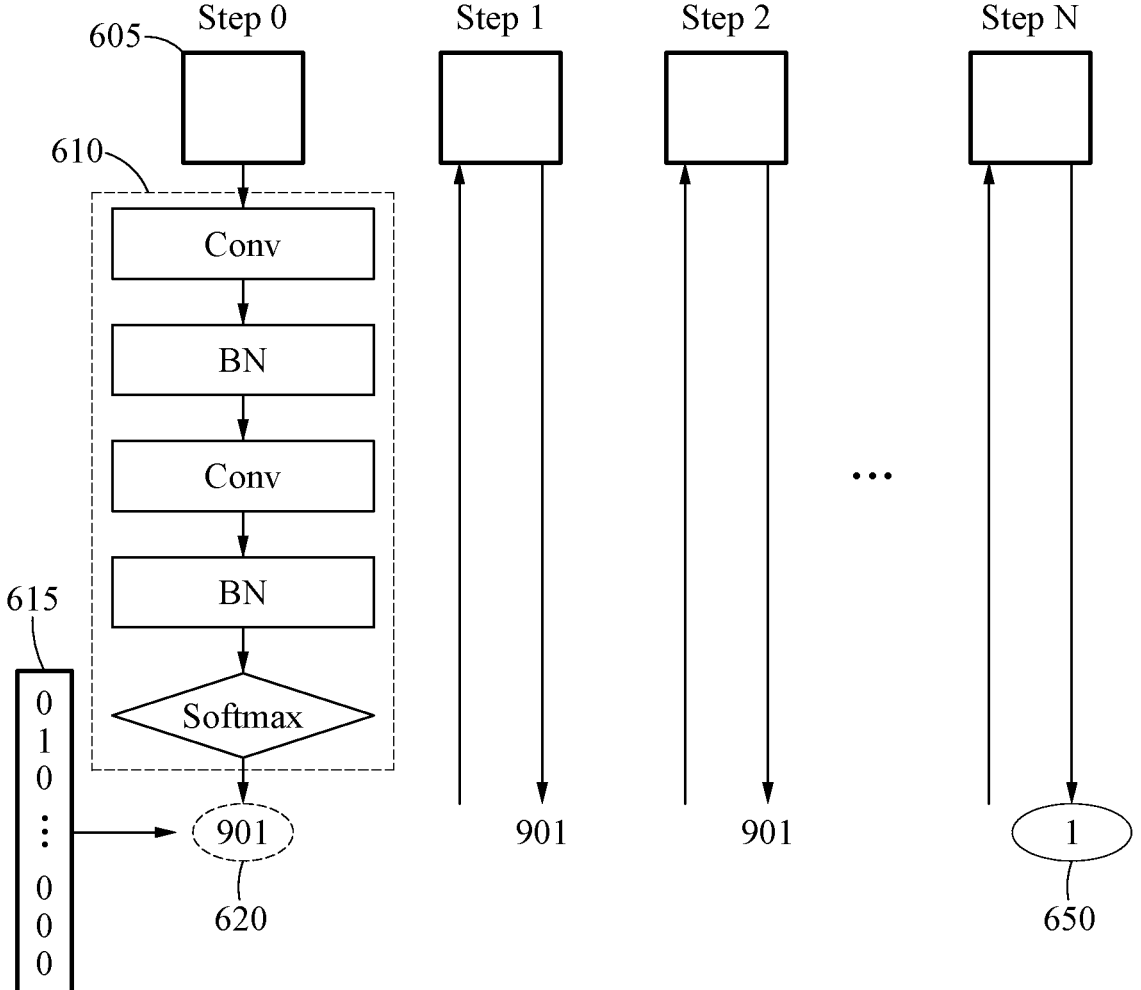
FIG. 6 is a diagram illustrating an example of a method of generating data.

FIG. 6 is a diagram illustrating an example of a method of generating data. FIGS. 5 and 6 illustrate a process of generating data by a compression apparatus through operations 510 to 540.

In operation 510, the compression apparatus generates a random noise image 605 corresponding to an input image of an artificial neural network 610. The artificial neural network 610 may include, for example, a convolutional (Conv) layer, a batch normalization (BN) unit, a fully-connected (FC) layer, and a softmax layer. The softmax layer may output a one-hot vector 615 that classifies a class of an input image.

In operation 520, the compression apparatus may acquire a result (e.g., class 901) that the artificial neural network 610 predicts with respect to the random noise image 605 generated in operation 510, using weights corresponding to the artificial neural network 610 trained in advance. The class 901 may correspond to an uppermost (Top-1) class predicted by the artificial neural network 610. In operation 520, the compression apparatus may train the artificial neural network 610 on the random noise image 605 to derive a target class (e.g., class 1) in an inference process, thereby acquiring a result (e.g., class 901) obtained by predicting a class with respect to the random noise image 605.

In operation 530, the compression apparatus may determine whether the Top-1 class (e.g., class 901 (620)) predicted by the artificial neural network 610 in operation 520) is the same as class 1 which is the target class (e.g., class i). For example, when it is determined in operation 530 that the predicted Top-1 class is the same as the target class (e.g., class i), the compression apparatus may terminate an operation.

In some cases, the class (e.g., class 901 (620)) predicted by the artificial neural network 610 may be determined to be different from the target class (e.g., class 1) in operation 530. In such cases, in operation 540, the compression apparatus may back-propagate, through a backward pass, a cross-entropy loss between the class (e.g., class 901 (620)) predicted by the artificial neural network 610 and the one-hot vector 615 in which only an element corresponding to the target class (e.g., class 1) is activated. At this time, the weights corresponding to the artificial neural network 610 may be simply transferred and fixed without changing during the backpropagation of the cross-entropy loss. The compression apparatus may use, for example, the one-hot vector 615 as a ground truth (GT) label to obtain the cross-entropy loss and train the random noise image 605 through the backpropagation.

The compression apparatus may back-propagate the cross-entropy loss to allow the artificial neural network 610 to correct the input image 605 in operation 540, and then may predict a class of the corrected input image through operation 520. The compression apparatus may generate data by correcting the input image 605 by repetitively performing the backpropagation of the cross-entropy loss through Step 1, Step 2, ..., Step N until the class (e.g., class 901) predicted in the artificial neural network is the target class (e.g., class 1) as indicated by reference numeral 650. In an example, as the backpropagation of the cross-entropy loss is repeated, a confidence score for the target class may gradually increase. Also, the compression apparatus may repetitively perform the training on the input image 605 until the uppermost class predicted in the artificial neural network 610 is the target class.

Through the above-described process, the compression apparatus may generate an input corresponding to each class and use the input image to determine a pruning threshold, thereby pruning the artificial neural network without using separate training data.

Figures 7, 8:
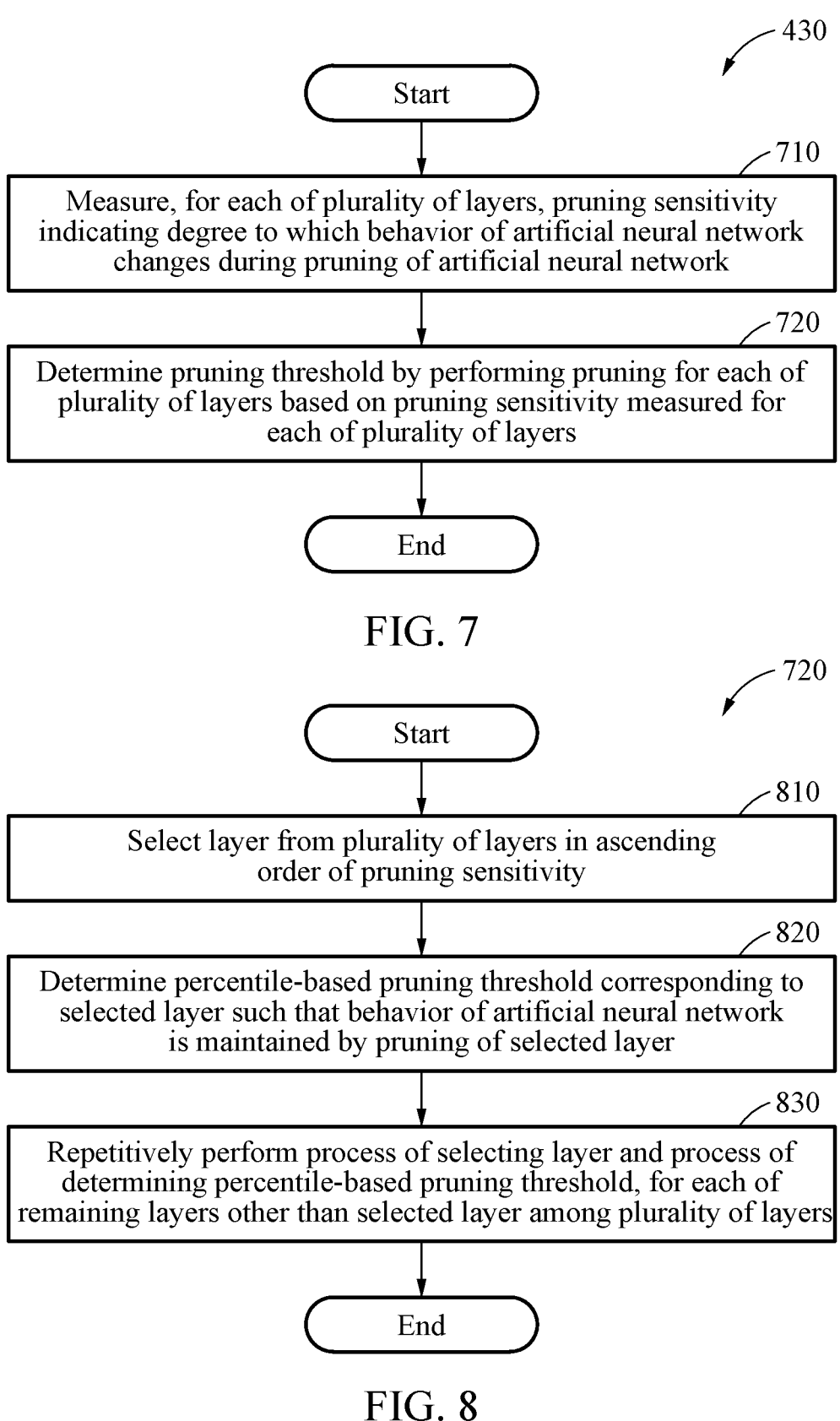
FIG. 7 is a diagram illustrating an example of a method of determining a pruning threshold.
FIG. 8 is a diagram illustrating an example of a method of determining a pruning threshold by performing pruning for each of layers.

FIG. 7 is a diagram illustrating an example of a method of determining a pruning threshold. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. For example, a compression apparatus may determine a pruning threshold through operations 710 and 720. In addition to the description of FIG. 7 below, the descriptions of FIGS. 1-6 are also applicable to FIG. 7, and are incorporated herein by reference. Thus, the above description may not be repeated here. Referring to FIG. 7.

In operation 710, the compression apparatus may measure, for each of a plurality of layers, a pruning sensitivity indicating a degree to which a behavior of an artificial neural network changes during pruning of the artificial neural network.

For example, in operation 710, the compression apparatus may measure, for each of the plurality of layers, a pruning sensitivity by gradually increasing a percentile-based pruning threshold corresponding to a corresponding layer by 1% until the behavior of the artificial neural network is maintained due to the pruning of the corresponding layer. The pruning sensitivity may be determined based on at least one of a distribution of weights corresponding to the layers and a form of connection between the layers. For example, in an image with text, most of the text is located in the center of the image while edges of the image are blank. In this example, weights may also be distributed in a portion corresponding to the center of the image. As such, the pruning sensitivity may be determined to vary based on a distribution of the weights. In addition, the form of connection between the layers may include a locational relationship between a corresponding layer and another layer.

In operation 720, the compression apparatus may determine a pruning threshold by performing pruning for each of the plurality of layers based on the pruning sensitivity measured for each of the plurality of layers. The measured pruning sensitivity may differ for each of the layers. For example, like the artificial neural network 610 described above, the artificial neural network may include a plurality of Cony layers, an FC layer, and a softmax layer. In this example, the pruning sensitivity may be differently measured for each of the Cony layers, the FC layer, and the softmax layer. Since the pruning is performed for each layer based on the pruning sensitivity of a corresponding layer, a decrease in accuracy due to the compression of the artificial neural network may be minimized.

The pruning threshold is a value used as a criterion for reducing or removing the weight of the artificial neural network and may be, for example, a percentile-based threshold. The pruning threshold may be fixed to a minimum of 0 and a maximum of 1, for example. By using the percentile-based pruning threshold, a phenomenon that a distribution of an output feature map is distorted due to the pruning when distributions of filters are different may be prevented.

In operation 720, for example, if Top-k classes predicted by the artificial neural network before the pruning and Top-p classes predicted by the artificial neural network after the pruning satisfy a criterion (e.g., k:p criterion), the compression apparatus may recognize that the behavior change of the artificial neural network due to pruning is not great, repetitively perform the pruning, and determine the pruning threshold. A method of determining, by a compression apparatus, a pruning threshold by performing pruning for each layer is described below in greater detail with reference to FIGS. 8 and 10.

FIG. 8 is a diagram illustrating an example of a method of determining a pruning threshold by performing pruning for each of layers. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. For example, FIG. 8 illustrates a process in which a compression apparatus determines a pruning threshold by performing pruning for each layer through operations 810 to 830. In addition to the description of FIG. 8 below, the descriptions of FIGS. 1-7 are also applicable to FIG. 8, and are incorporated herein by reference. Thus, the above description may not be repeated here. Referring to FIG. 8.

In operation 810, the compression apparatus may select a layer from a plurality of layers in an ascending order of the pruning sensitivity. Here, a low pruning sensitivity may indicate that a behavior change due to pruning is not great, in other words, robust to the pruning. Therefore, "the pruning sensitivity is low" may be understood as the same as "robust to the pruning."

In operation 820, the compression apparatus may determine a percentile-based pruning threshold corresponding to the layer selected in operation 810 such that a behavior of an artificial neural network is maintained by pruning of the layer selected in operation 810. A method of determining the percentile-based pruning threshold corresponding to the layer selected in operation 810 is described below with reference to FIG. 9.

In operation 830, the compression apparatus may repetitively perform a process (e.g., operation 810) of selecting the layer and a process (e.g., operation 820) of determining the percentile-based pruning threshold, for each of remaining layers other than the layer selected in operation 810 among the plurality of layers.

Figure 9:
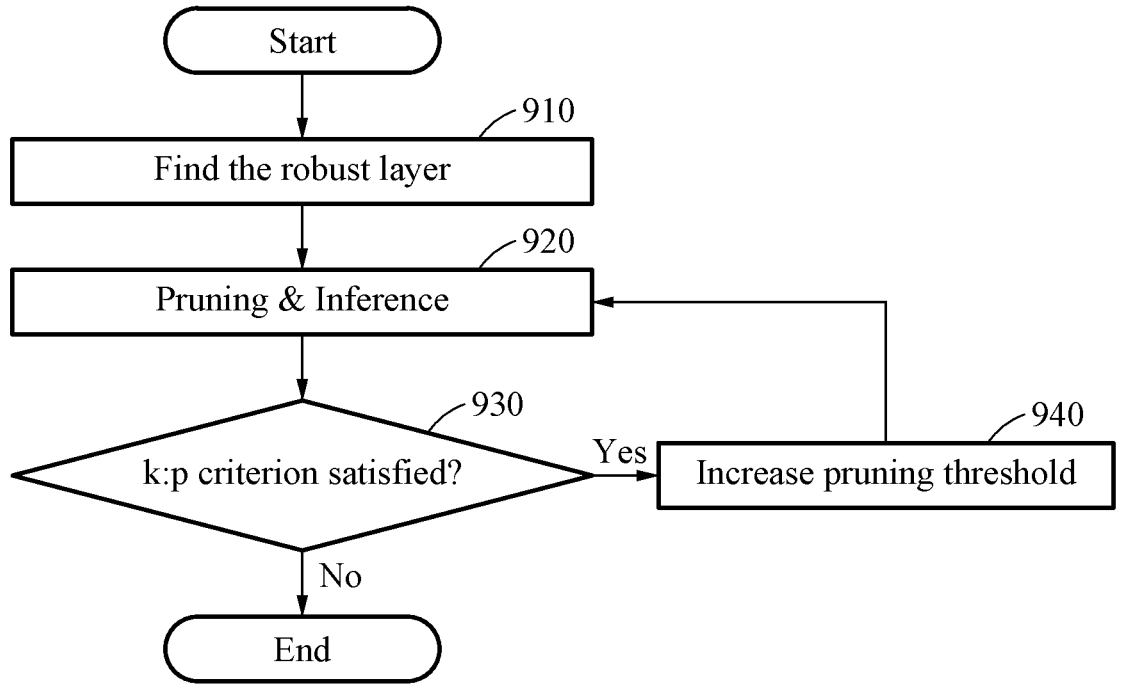
FIG. 9 is a diagram illustrating an example of a method of determining a percentile-based pruning threshold corresponding to a layer.

FIG. 9 is a diagram illustrating an example of a method of determining a percentile-based pruning threshold corresponding to a layer. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. For example, FIG. 9 illustrates a process in which a compression apparatus determines a percentile-based pruning threshold in a layer of an artificial neural network through operations 910 to 940. In addition to the description of FIG. 9 below, the descriptions of FIGS. 1-8 are also applicable to FIG. 9, and are incorporated herein by reference. Thus, the above description may not be repeated here. Referring to FIG. 9.

In operation 910, the compression apparatus may search for a layer robust to pruning, that is, a layer having a low pruning sensitivity from a plurality of layers of an artificial neural network based on the pruning sensitivity measured through the above-described process.

In operation 920, the compression apparatus may prune a layer found from the searching in operation 910 and acquire an output corresponding to an inference result of a pruned artificial neural network. The inference result of the pruned artificial neural network may correspond to, for example, upper p classes predicted by the artificial neural network with respect to an input image.

In operation 930, the compression apparatus may determine whether the inference result of operation 920 satisfies a k:p decision criterion (hereinafter, referred to as a "k:p criterion"). Here, the k:p criterion may correspond to a criterion for acquiring a degree to which a behavior of the artificial neural network is changed during the pruning. The k:p criterion may include a first condition that top classes predicted by the artificial neural network before and after the pruning are the same and a second condition that a combination of upper k (Top-k) classes predicted by the artificial neural network before the pruning matches a combination of upper p (Top-p) classes predicted by the artificial neural network after the pruning. For example, "a combination of upper k (Top-k) classes predicted by the artificial neural network before the pruning matches a combination of upper p (Top-p) classes predicted by the artificial neural network after the pruning" may be understood as that the upper k classes predicted by the artificial neural network before the pruning are included in the upper p classes predicted by the artificial neural network after the pruning. Here, k and p may each be a natural number, and k≤p. For example, when it is determined in operation 930 that the inference result does not satisfy the k:p criterion, the compression apparatus may terminate an operation.

In some cases, the inference result may be determined as satisfying the k:p criterion in operation 930. In such cases, the compression apparatus may recognize that the behavior change of the artificial neural network is not great and increase the pruning threshold by, for example, 1% in operation 940. The compression apparatus may perform the pruning and inference of operation 920 again by the pruning threshold increased in operation 940.

The compression apparatus may determine a pruning threshold of a selected layer by performing pruning while gradually increasing a percentile-based pruning threshold corresponding to the corresponding layer such that the behavior of the artificial neural network is maintained by the pruning of the corresponding layer. Here, "the behavior of the artificial neural network is maintained by the pruning" may be understood as that a meaningful behavior change causing a change in inference accuracy of the artificial neural network due to the pruning of the artificial neural network does not occur.

Figure 10:
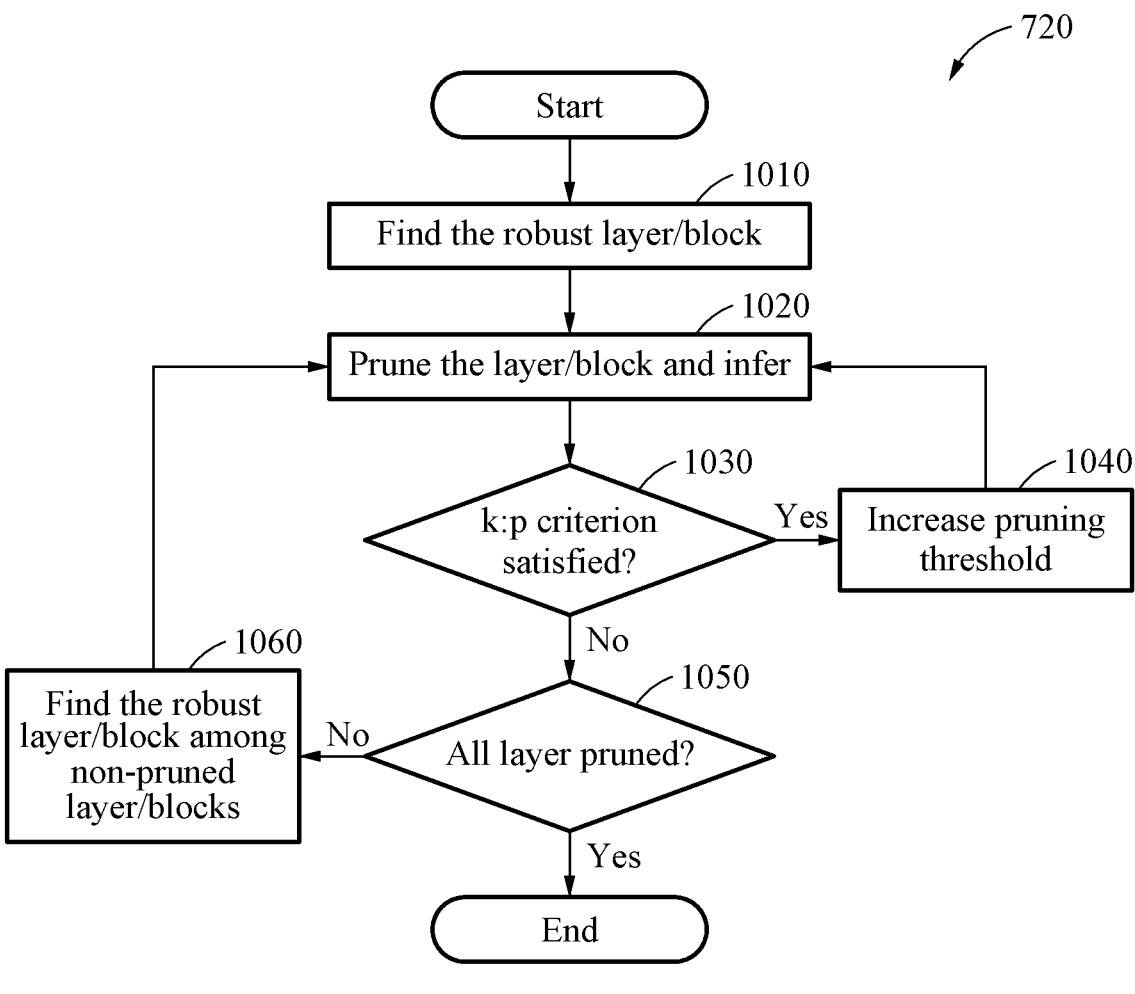
FIG. 10 is a diagram illustrating another example of a method of determining a pruning threshold by performing pruning for each of layers.

FIG. 10 is a diagram illustrating another example of a method of determining a pruning threshold by performing pruning for each of layers. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. For example, FIG. 10 illustrates a process in which a compression apparatus determines a pruning threshold for each layer through operations 1010 to 1060. In addition to the description of FIG. 10 below, the descriptions of FIGS. 1-9 are also applicable to FIG. 10, and are incorporated herein by reference. Thus, the above description may not be repeated here. Referring to FIG. 10.

In operation 1010, the compression apparatus may search for a layer (e.g., layer A) having a lowest pruning sensitivity from a plurality of layers of an artificial neural network based on the pruning sensitivity measured in the above-described process.

In operation 1020, the compression apparatus may prune a layer (e.g., layer A) found in operation 1010 or a block of the corresponding layer (e.g., layer A) and acquire an inference result of a pruned artificial neural network. The layer may include a plurality of kernels. Also, the layer may also be referred to as a block in a sense of including the plurality of kernels. The inference result of the pruned artificial neural network may correspond to, for example, upper p classes predicted by the artificial neural network with respect to an input image.

In operation 1030, the compression apparatus may determine whether the inference result of operation 1020 satisfies a k:p criterion.

For example, when it is determined in operation 1030 that the inference result satisfies the k:p criterion, a behavior change of the artificial neural network may not be great. In an example, the compression apparatus may increase a pruning threshold of the corresponding layer (e.g., layer A) in operation 1040. The compression apparatus may perform the pruning and inference of operation 1020 again by the pruning threshold increased in operation 1040.

In some cases, the inference result may be determined as not satisfying the k:p criterion in operation 1030. In such cases, in operation 1050, the compression apparatus may determine whether the pruning for all layers in the artificial neural network is completed. When it is determined in operation 1050 that the pruning for all the layers is completed, the compression apparatus may terminate an operation.

If it is determined in operation 1050 that the pruning for all the layers is not completed, in operation 1060, the compression apparatus may search for a layer having a lowest pruning sensitivity from remaining layers other than the layer (e.g., layer A) found in operation 1010.

The compression apparatus may perform acquisition of a result of the pruning and inference of operation 1020 on a layer found in operation 1060.

The compression apparatus may sequentially select a layer or block having a low pruning sensitivity from the artificial neural network by the threshold newly defined through operation 1040, and perform the pruning until the selected layer or block does not make a meaningful behavior change in the artificial neural network. In this instance, the compression apparatus may recognize a degree of the behavior change of the artificial neural network using the k:p criterion. The compression apparatus may prune all the layers of the artificial neural network by repeating the above-described process for remaining layers when the pruning of one layer is terminated.

Figure 11:
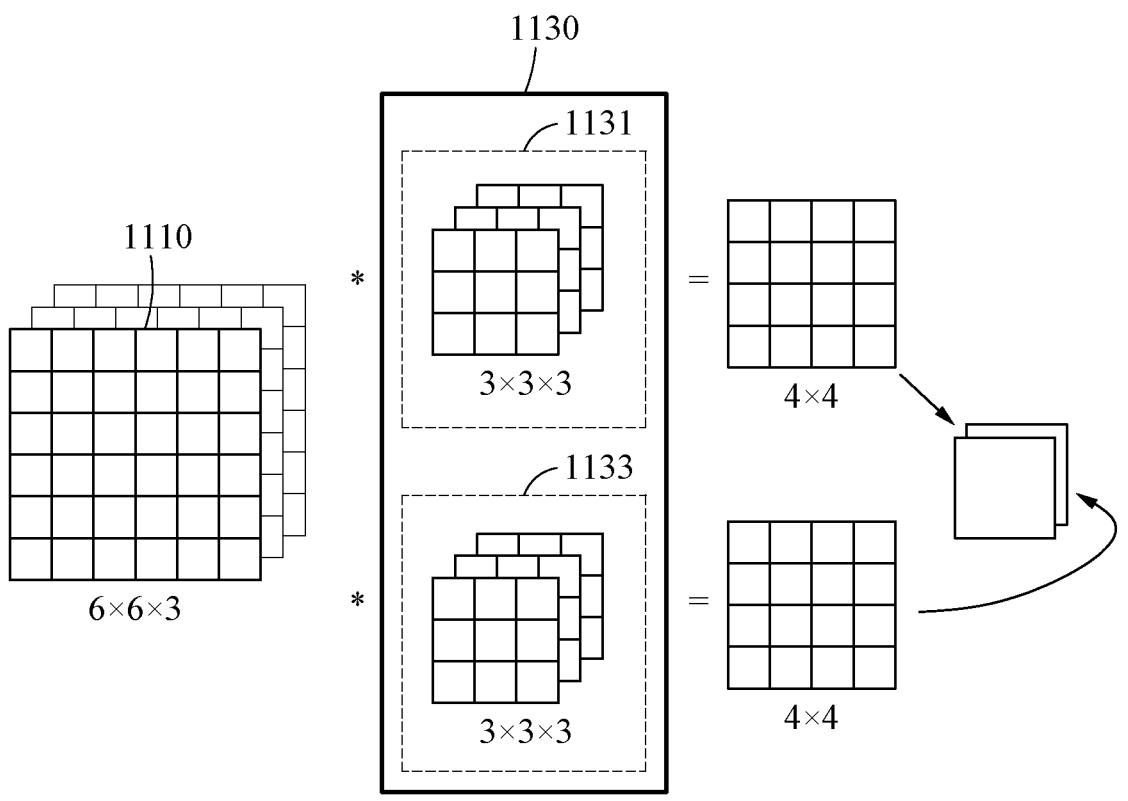
FIG. 11 is a diagram illustrating an example of a process of applying a pruning threshold in units of a kernel.

FIG. 11 is a diagram illustrating an example of a process of applying a pruning threshold in units of a kernel. FIG. 11 illustrates a method of determining a pruning threshold in a case in which a layer 1130 of an artificial neural network includes a plurality of kernels 1131 and 1133.

For example, an input image 1110 may include three channels of red (R), green (G), and blue (B) in a size of 6×6×3. Also, kernels 1131 and 1133 may each have a size of 3×3×3. The kernels 1131 and 1133 may be filters for finding features of the input image 1110. In this case, a compression apparatus may generate an output feature map having a size of 4×4×2 by performing a convolution operation for each kernel while moving the kernels 1131 and 1133 at preset intervals with respect to the input image 1110.

The layer 1130 in the artificial neural network may include the plurality of kernels 1131 and 1133 as illustrated in FIG. 11. In this case, the plurality of kernels 1131 and 1133 included in the same layer 1130 may share a percentile-based pruning threshold. The compression apparatus may perform pruning for each of the plurality of kernels 1131 and 1133 included in the layer 1130 by applying a magnitude-based pruning threshold for each of the kernels based on a percentile-based pruning threshold of a corresponding layer, so as to compress the artificial neural network.

For example, 30% of the pruning threshold may be shared for the layer 1130 of the artificial neural network. In this example, the pruning may be performed for the kernels 1131 and 1133 of the layer 1130 by different thresholds proportional to magnitudes of weights included in the corresponding kernels. For example, weights corresponding to lower 30% of weights included in a first kernel (e.g., the kernel 1131) may be pruned, and weights corresponding to lower 30% of weights included in a second kernel (e.g., the kernel 1133) may be pruned. In this example, a threshold of the weights corresponding to lower 30% of the weights of the first kernel 1131 may be different from a threshold of the weights corresponding to lower 30% of the weights of the second kernel 1133.

The compression method described with reference to FIGS. 1 through 11 may also apply substantially equal to a case in which quantization is performed while maintaining an accuracy of an artificial neural network without decreasing. For example, a degree of quantization for each layer may be controlled based on a number of quantization bits. Also, the quantization may be applied to layers in a descending order of robustness to quantization. In this example, a k:p criterion may be used to measure a sensitivity of each layer responding to the quantization.

The examples described with reference to FIGS. 1 through 11 may employ a data distillation technique to generate data for acquiring a behavior change of an artificial neural network. In an example, a generative adversarial network (GAN) or autoencoder may be used to generate data for acquiring a behavior change of an artificial neural network.

For example, the autoencoder may include an encoding part and a decoding part. The decoding part of the autoencoder may serve to receive an output of the encoding part and restore an input of the encoding part. After applying a pre-trained artificial neural network to the encoding part of the autoencoder, the decoding part of the autoencoder may be trained. Thereafter, using the decoding part of the autoencoder, data for acquiring a behavior change of the artificial neural network may be generated. Also, a discriminator included in a GAN structure may be additionally used when training the decoding part of the autoencoder.

Figure 12:
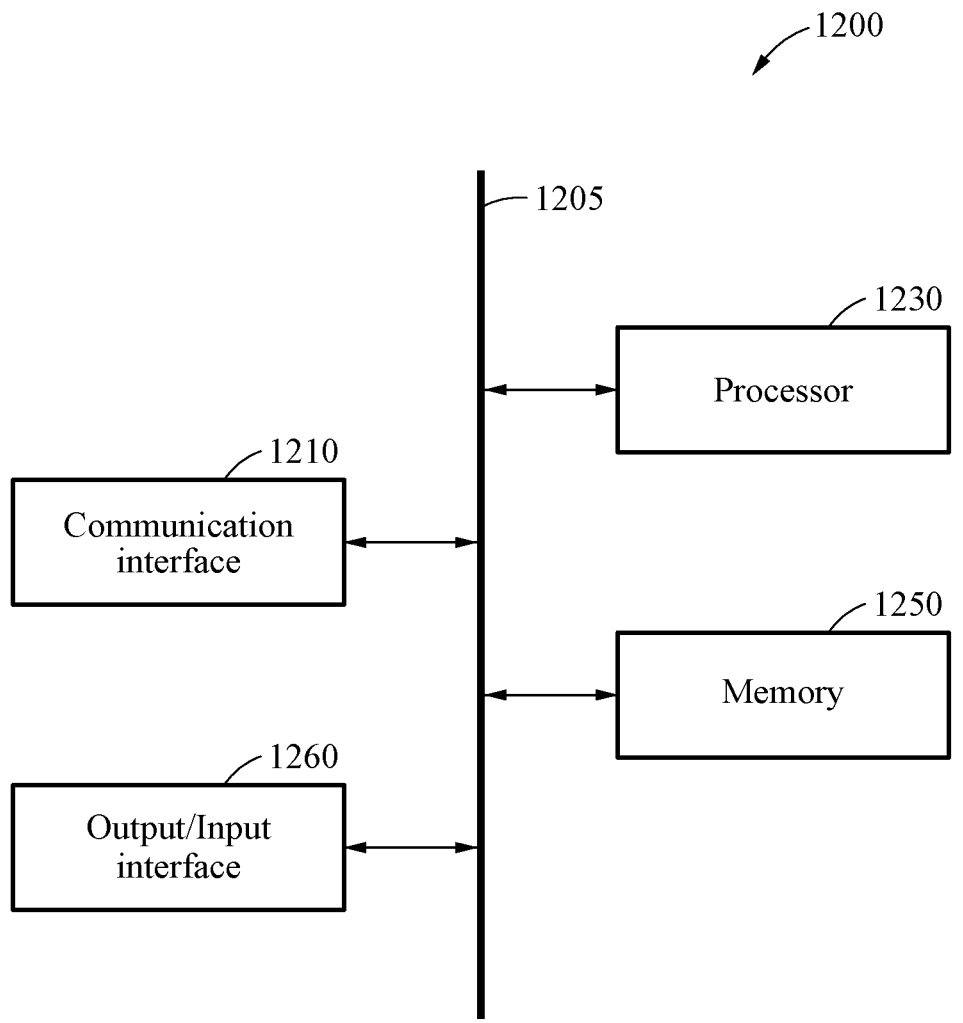
FIG. 12 is a diagram illustrating an example of an apparatus for compressing an artificial neural network.

FIG. 12 is a diagram illustrating an example of an apparatus for compressing an artificial neural network 1200. Referring to FIG. 12, an apparatus for compressing an artificial neural network (hereinafter, referred to as a "compression apparatus") 1200 includes a communication interface 1210, a processor 1230, a memory 1250, and an output/input interface 1260. The communication interface 1210, the processor 1230, the memory 1250, and the output/input interface 1260 may be connected through a communication bus 1205.

The communication interface 1210 acquires weights corresponding to an artificial neural network trained in advance. The artificial neural network includes a plurality of layers.

The processor 1230 generates data for acquiring a behavior change of the artificial neural network due to pruning of the artificial neural network based on the weights acquired through the communication interface 1210. The processor 1230 determines a pruning threshold for pruning of the artificial neural network through the behavior change of the artificial neural network acquired by the data. The processor 1230 compresses the neural network based on the pruning threshold.

In addition, the processor 1230 may perform at least one of the methods described with reference to FIGS. 1 through 11 or an algorithm corresponding to at least one of the methods. The processor 1230 may be a hardware-implemented compression apparatus having a circuit that is physically structured to execute desired operations. For example, the desired operations include code or instructions included in a program. The hardware-implemented compression apparatus includes, but is not limited to, for example, a microprocessor, a central processing unit (CPU), graphics processing unit (GPU), a processor core, a multi-core processor, a multiprocessor, an application-specific integrated circuit (ASIC), a field-programmable gate array (FPGA), and a neural processing unit (NPU). Further details regarding the processor 1230 is provided below.

The processor 1230 may execute a program and control the compression apparatus 1200. Codes of the program executed by the processor 1230 are stored in the memory 1250.

The memory 1250 may store, for example, weights acquired through the communication interface 1210. In this example, the weights may correspond to a parameter of an artificial neural network including a plurality of layers.

Also, the memory 1250 may store the data generated in the processor 1230 and/or the pruning threshold determined in the processor 1230. In addition, the memory 1250 may store information on an artificial neural network compressed by the processor 1230. The information on the compressed artificial neural network may include, for example, information on a pruned layer.

As such, the memory 1250 may store various information generated during a processing operation of the processor 1230 as described above. In addition, the memory 1250 may store a variety of data and programs. The memory 1250 may include a volatile memory or a non-volatile memory. The memory 1250 may include a large-capacity storage medium such as a hard disk to store the variety of data.

The apparatus for compressing an artificial neural network 1200 may further include an output/input interface 1260 configured to output a result of processing by artificial neural network, or to receive an input. In an example, the output/input interface 1260 may receive a user input. The input device may detect an input from, for example, a keyboard, a mouse, a touch screen, a microphone, or a user, and may include any other device configured to transfer the detected input. The output device may provide an output to a user through a visual scheme, an auditory scheme, or a tactile scheme. The output device may include, for example, a display, such as, for example, computer monitor, smartphone, a smart television (TV), a tablet, a head-up display (HUD), a three-dimensional (3D) digital information display (DID), a 3D mobile device, and a smart automobile, display of an advanced driver-assistance systems (ADAS), and eye glass display (EGD) that are operatively connected to the apparatus for compressing an artificial neural network 1200 may be used without departing from the spirit and scope of the illustrative examples described.

The compression apparatus 1200 may correspond to a device of various fields, such as an advanced driver assistance system (ADAS), a head-up display (HUD) device, a three-dimensional (3D) digital information display (DID), a navigation device, a neuromorphic device, a 3D mobile device, a smartphone, a smart TV, a smart vehicle, an Internet of Things (IoT) device, a medical device, and a measurement device. The 3D mobile device may be understood in a sense of including, for example, a display device for displaying an augmented reality (AR), a virtual reality (VR), and/or a mixed reality (MR), a head mounted display (HMD), and a face mounted display (FMD).

The apparatus for compressing an artificial neural network 1200, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, multiple-instruction multiple-data (MIMD) multiprocessing, a controller and an arithmetic logic unit (ALU), a DSP, a microcomputer, a field-programmable gate array (FPGA), an application-specific integrated circuit (ASIC), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions, or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of compressing an artificial neural network. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that may be configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of compressing a previously trained artificial neural network, the method comprising:

generating, based on weights corresponding to the artificial neural network of a plurality of layers, new image information for determining a change in behavior of the artificial neural network due to pruning, with the new image information being generated by iteratively modifying input image information until a class predicted by the artificial neural network based on the modified input image information is a target class from among a plurality of classes;

generating a corresponding pruning sensitivity for each of the plurality of layers in the artificial neural network using the new image information, which includes the modified input image information, each of the corresponding pruning sensitivities-indicating a degree to which the behavior of the artificial neural network changes when a respective layer is pruned;

determining, respectively based on the corresponding pruning sensitivities, a corresponding layer-specific pruning threshold for pruning each of the plurality of layers;

generating a compressed artificial neural network for the plurality of layers by pruning, for each of the plurality of layers, the artificial neural network based on the corresponding layer-specific pruning threshold; and generating a recognition result or a classification result by executing the compressed neural network, wherein the new image information is used, in the generating of the corresponding pruning sensitivity for each of the plurality of layers, to evaluate changes in the behavior of the artificial neural network when different layers are pruned, thereby eliminating a requirement for using training data for determining pruning thresholds, wherein, as a result of the generating of the new image information, the new image information comprises a corresponding modified input image information for each of multiple classes of the plurality of classes, and wherein the input image information is noise image information.

2. The method of claim 1, wherein the generating of the corresponding pruning sensitivity for each of the plurality of layers comprises:

generating, respectively for each of the plurality of layers, the corresponding pruning sensitivity by gradually increasing a percentile-based pruning threshold for a corresponding layer, in response to the behavior of the artificial neural network being maintained by a corresponding pruning of the corresponding layer.

3. The method of claim 1, wherein the corresponding pruning sensitivities are determined based on at least one of a distribution of weights corresponding to the plurality of layers or a form of connection between the plurality of layers.

4. The method of claim 1, wherein the determining of the corresponding pruning threshold for pruning each of the plurality of layers comprises:

selecting a layer from among the plurality of layers in an ascending order of the corresponding pruning sensitivities;

determining a percentile-based pruning threshold corresponding to the selected layer such that the behavior of the artificial neural network is maintained by a corresponding pruning of the selected layer; and repeating the selecting of the layer and the determining of the percentile-based pruning threshold corresponding to the selected layer, until all remaining layers of the plurality of layers have been selected as the selected layer.

5. The method of claim 1, wherein the determining of the corresponding pruning threshold for pruning each of the plurality of layers comprises:

selecting a layer from among the plurality of layers in an ascending order of the pruning sensitivities;

pruning the selected layer to determine a percentile-based pruning threshold; and determining a percentile-based pruning threshold, in response to upper k classes predicted by the artificial neural network before the pruning being included in upper p classes predicted by the artificial neural network after the pruning, wherein k and p each are a natural number and $k \leq p$.

6. The method of claim 5, wherein the determining of the percentile-based pruning threshold further comprises:

increasing the percentile-based pruning threshold by a set interval, in response to the behavior of the artificial neural network being maintained by the pruning of the selected layer.

7. The method of claim 1, wherein the degree to which the behavior of the artificial neural network changes when the respective layer is pruned is measured based on whether outputs of the artificial neural network before and after the pruning of the respective layer satisfy a decision criterion.

8. The method of claim 7, wherein the decision criterion comprises a condition that upper p classes predicted by a pruned artificial neural network comprise upper k classes predicted by an unpruned artificial neural network, wherein k and p each are a natural number and $k \leq p$.

9. The method of claim 1, wherein each of the corresponding layer-specific pruning thresholds comprises: a respective percentile-based pruning threshold, and wherein the pruning of the artificial neural network comprises: applying, for each of a plurality of kernels in a corresponding layer of the plurality of layers, a magnitude-based pruning threshold to a corresponding kernel based on the respective percentile-based pruning threshold of the corresponding layer-specific pruning threshold of the corresponding layer.

10. The method of claim 9, wherein the pruning of the artificial neural network comprises removing a percentage of the weights of the artificial neural network, wherein the percentage of the weights corresponds to the respective percentile-based pruning thresholds.

11. The method of claim 1, wherein the input image information is a random noise image.

12. The method of claim 1, wherein the generating of the new image information comprises:

back-propagating a cross-entropy loss between a one-hot vector corresponding to the target class and the class predicted by the artificial neural network.

13. The method of claim 12, wherein the weights are fixed without changing during backpropagation of the cross-entropy loss.

14. A non-transitory computer-readable storage medium storing instructions that, when executed by one or more processors, cause the one or more processors to perform the method of claim 1.

15. An apparatus for compressing a previously trained artificial neural network, the apparatus comprising:

one or more processors; and memory storing instructions that, when executed by the one or more processors, cause the apparatus to:

generate, based on weights corresponding to the artificial neural network of a plurality layers, new image information for determining a change in behavior of the artificial neural network due to pruning, with the new image information being generated by iteratively modifying input image information until a class predicted by the artificial neural network based on the modified input image information is a target class from among a plurality of classes;

generate a corresponding pruning sensitivity for each of the plurality of layers in the artificial neural network using the new image information, which includes the modified input image information, each of the corresponding pruning sensitivities indicating a degree to which the behavior of the artificial neural network changes when a respective layer is pruned;

determine, respectively based on the corresponding pruning sensitivities, a corresponding layer-specific pruning threshold for pruning each of the plurality of layers;

generate a compressed artificial neural network for the plurality of layers by pruning, for each of the plurality of layers, the artificial neural network based on the corresponding layer-specific pruning threshold; and generate a recognition result or a classification result by executing the compressed neural network, wherein the new image information is used, in the generation of the corresponding pruning sensitivity for each of the plurality of layers, to evaluate changes in the behavior of the artificial neural network when different layers are pruned, thereby eliminates a requirement for using training data for determining pruning thresholds, wherein, as a result of the generation of the new image information, the new image information comprises a corresponding modified input image information for each of multiple classes of the plurality of classes, and wherein the input image information is noise image information.

16. The apparatus of claim 15, wherein the generation of the corresponding pruning sensitivity for each of the plurality of layers comprises a generation, respectively for each of the plurality of layers, the corresponding pruning sensitivity by gradually increasing a percentile-based pruning threshold for a corresponding layer, in response to the behavior of the artificial neural network being maintained by a corresponding pruning of the corresponding layer.

17. The apparatus of claim 15, wherein, for the determination of the corresponding pruning threshold for pruning each of the plurality of layers, the execution of the instructions causes the apparatus to determine the corresponding pruning sensitivities based on at least one of a distribution of weights corresponding to the plurality of layers or a form of connection between the plurality of layers.

18. The apparatus of claim 15, wherein, for the determination of the corresponding pruning threshold for pruning each of the plurality of layers, the execution of the instructions causes the apparatus to:

select a layer from among the plurality of layers in an ascending order of the corresponding pruning sensitivities;

determine a percentile-based pruning threshold corresponding to the selected layer such that the behavior of the artificial neural network is maintained by a corresponding pruning of the selected layer' and repeat the selection of the layer and the determination of the percentile-based pruning threshold corresponding to the selected layer, until all remaining layers of the plurality of layers have been selected as the selected layer.

19. The apparatus of claim 15, wherein the degree to which the behavior of the artificial neural network changes when the respective layer is pruned is measured based on whether outputs of the artificial neural network before and after the pruning of the respective layer satisfy a decision criterion.

20. The apparatus of claim 19, wherein the decision criterion comprises a condition that upper p classes predicted by a pruned artificial neural network comprise upper k classes predicted by an unpruned artificial neural network, wherein k and p each are a natural number and $k \leq p$.

21. The apparatus of claim 15, wherein each of the corresponding layer-specific pruning thresholds comprises: a respective percentile-based pruning threshold, and wherein, for the pruning of the artificial neural network, the execution of the instructions cause the apparatus to apply, for each of a plurality of kernels in a corresponding layer of the plurality of layers, a magnitude-based pruning threshold to a corresponding kernel based on the respective percentile-based pruning threshold of the corresponding layer-specific pruning threshold of the corresponding layer.

22. The apparatus of claim 15, wherein the input image information is a random noise image.

23. The apparatus of claim 15, wherein, for the generation of the new image information, the execution of the instructions causes the apparatus back-propagate a cross-entropy loss between a one-hot vector corresponding to the target class and the class predicted by the artificial neural network.

24. The apparatus of claim 23, wherein the weights are fixed without changing during backpropagation of the cross-entropy loss.

25. The apparatus of claim 15, wherein the apparatus is at least one of an advanced driver assistance system (ADAS), a head-up display (HUD) device, a three-dimensional (3D) digital information display (DID), a navigation device, a neuromorphic device, a 3D mobile device, a smartphone, a smart television (TV), a smart vehicle, an Internet of Things (IoT) device, a medical device, or a measurement device.

26. The method of claim 1, wherein the generating of the new image information comprises performing the iterative modifying of the input image information for each class, as respectively different target classes in each different iterative modifying of the input image information, of the plurality of classes.

27. The method of claim 1, wherein the new image information comprises the corresponding modified input image information for each class of the plurality of classes.

* * * * *